United States Patent [19]

Duckwall, Jr.

[11] Patent Number: 4,539,369

[45] Date of Patent: Sep. 3, 1985

[54] PROCESS FOR PRODUCING POLY (VINYL ACETALS)

[75] Inventor: Louis R. Duckwall, Jr., Ponca City, Okla.

[73] Assignee: Conoco Inc., Ponca City, Okla.

[21] Appl. No.: 634,051

[22] Filed: Jul. 30, 1984

Related U.S. Application Data

[63] Continuation-in-part of Ser. No. 528,343, Aug. 31, 1983, abandoned.

[51] Int. Cl.³ ............................................. C08F 16/06
[52] U.S. Cl. ..................................................... 525/61
[58] Field of Search ......................................... 525/61

[56] References Cited

U.S. PATENT DOCUMENTS 2,143,228  1/1939  Orthner ................................ 525/61

Primary Examiner—Paul R. Michl
Attorney, Agent, or Firm—Cortlan R. Schupbach

[57] ABSTRACT

An improved method for the production of poly (vinyl acetals) using no added catalyst comprises mixing poly (vinyl alcohol) and an excess amount of aldehyde to produce poly (vinyl acetals), wherein the reaction is driven by removal of water in the form of an aldehyde-water azeotrope.

4 Claims, No Drawings

PROCESS FOR PRODUCING POLY (VINYL ACETALS)

This is a continuation-in-part of application Ser. No. 528,343, filed Aug. 31, 1983, now abandoned.

BACKGROUND OF THE INVENTION

This invention is an improved process for producing poly (vinyl acetals). All known practices for the production of poly (vinyl acetal) consist of combining a poly (vinyl alcohol) with an aldehyde in the presence of added catalyst.

U.S. Pat. No. 1,990,399 describes the production of poly (vinyl acetal) in a one phase batch process using aqueous hydrochloric acid as a catalyst and solvent. Separate feedstocks of poly vinyl alcohol) and aldehyde are added.

Another process for the production of poly (vinyl acetals) described in U.S. Pat. No. 2,545,683, involves a condensation reaction between poly (vinyl alcohol) or a partially hydrolyzed ester of poly (vinyl alcohol) and a class of reactants called Shiff bases. These Shiff base reactants are prepared by the condensation reaction of a primary amine with an aromatic ketone.

Other methods producing poly (vinyl acetals) include U.S. Pat. No. 2,487,864 and U.S. Pat. No. 2,513,189 which describe condensation reactions between poly (vinyl alcohol) and aldehyde taking place in a water-containing polar solvent in the presence of an acid catalyst.

BRIEF DESCRIPTION OF THE INVENTION

An improved process for the production of poly (vinyl acetals), carried out as either a batch or continuous process, without added catalyst proceeds by the use of a large excess of aldehyde and driven by removal of water produced in the reaction as an azeotrope of water and aldehyde. This "catalyst-free" method for the production of poly (vinyl acetals) is economical because the aldehyde can be recycled, there is no catalyst to neutralize, and no water cleanup problem, except for the relatively small portion produced during the removal of the azeotrope. The poly (vinyl acetal) product is then recovered by simple stripping of the aldehyde from the polymeric solution.

The instant process is "catalyst-free" in that catalyst addition to the reactant is not required. The reaction can be made continuous by adding poly (vinyl alcohol) and aldehyde to the reaction mixture as the reaction occurs, while the azeotropic distillation continuously removes water and aldehyde, and the poly (vinyl acetal) product is removed as an effluent stream. During this continuous process, the azeotropic distillation removes water, forcing the production of more poly (vinyl acetal).

Liquid phase conditions must be maintained for this process, since a large excess of aldehyde and solution of the polymer is mandatory. Thus, the temperature and pressure maintained in the process must be sufficient to provide liquid conditions, although within this requirement, the exact temperature and pressure are determined by the type of aldehyde used. The aldehyde must form a water azeotrope to be effective in the process.

A stoichiometric excess of aldehyde must be maintained, and in a continuous process such excess is preferably maintained by recycling the recovered aldehyde. A preferred stoichiometric excess for this process ranges from about a 5-to-1 to about a 20-to-1 aldehyde/alcohol excess.

DETAILED DESCRIPTION OF THE INVENTION

Poly (vinyl acetal) is formed by a reaction between poly (vinyl alcohol) and an aldehyde. The instant invention utilizes a poly (vinyl alcohol) reactant that is from about 25 to about 100 weight percent hydrolyzed. Preferably, the poly (vinyl alcohol) is hydrolyzed from about 50 to about 100 weight percent. The preferred molecular weight range for the poly (vinyl alcohol) used as a reactant in the instant process is from about 500 to about 200,000 number or weight average.

Only those aldehydes capable of forming an azeotrope with water can be used with the instant invention. Mixtures of these aldehydes can be used. Therefore, the aldehydes in excess of $C_6$ are of limited usefulness, since higher carbon number aldehydes form less aldehyde/water azeotrope. Aldehydes preferred are linear aliphatic aldehydes containing from 1 to about 6 carbon atoms. Representative, but nonexhaustive examples of these aldehydes are:

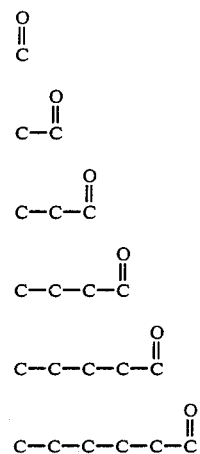

The most preferred aldehydes are propionaldehyde, butyraldehyde, and valeraldehyde.

The temperature range of the process is determined by the azeotropic temperature range of the water-aldehyde mixture, which encompasses the vapor pressure and type of aldehyde used in the reaction. Certain temperature and pressure ranges, however, are preferred when the linear aliphatic aldehydes of the present invention are used. When using linear aliphatic aldehydes containing from 1 to 6 carbon atoms the preferred temperature range is from about 60° C. to about 150° C. The most preferred temperature range for the most preferred aldehydes, propionaldehyde, butyraldehyde, and valeraldehyde is from about 60° C. to about 100° C.

Generally, any pressure which is sufficient to maintain liquid conditions at the reaction temperature is sufficient for this process. The preferred pressure range is from about one to about 15 atmospheres, while the preferred pressure range for linear aliphatic aldehydes containing one to three carbon atoms is from about 3 to about 15 atmospheres.

The azeotropic separation of water and excess aldehyde can be accomplised by any means normally employed, such as mechanical means achieving the removal of the azeotropic material, i.e., distillation. Water and aldehyde separate from the azetrope at ambient temperature and the aldehyde can be recycled after the azeotropic separation. The instant process can be carried out batchwise, in which case the water formed is removed in the azeotrope as the reaction proceeds to completion. Additional aldehyde may be added if needed to complete the reaction, after which time the poly (vinyl acetal) product is removed. Such removal is by any convenient means such as stripping of excess aldehyde.

A continuous process can also be maintained in accordance with the instant invention by continuously removing azeotrope while continuously adding poly (vinyl alcohol) and aldehyde. It is critical that excess aldehyde be maintained in the system during the reaction, and most practical to recycle the stripped aldehyde. In such a case, the poly (vinyl acetal) solution is removed continually and stripped while the use of the aldehyde-water azeotrope achieves the removal of water by-product and excess aldehyde, thus advantageously forcing the reaction further to desirable poly (vinyl acetal). The recycled aldehyde is combined with poly (vinyl alcohol) and supplemented with additional aldehyde in order to maintain the necessary stoichiometric excess.

Separation of poly (vinyl acetal) product, whether by a batch or a continuous process, can be accomplished by any conventional manner known to those skilled in this art, such as settling, evaporation, vacuum stripping, and distillation.

Conveniently, the azeotropic removal of aldehyde and water may be accomplished by distillation, a flash system, or any other mechanical means capable of removing materials in an azeotrope. Aldehyde removed together with water can be separated by settling and recycled.

This process also allows control of the level of acetalization, by controlling the feed rate of the aldehyde and the poly (vinyl alcohol) and simultaneously maintaining and regulating the rate of azeotropic removal of water and aldehyde. Acetalization can range from about 25 to about 100 percent by weight. A preferred range is from about 50 to about 100 percent by weight.

The most preferred acetalization range is from about 80 to 100 weight percent. Acetalization in excess of 80 weight percent can be achieved through continuous azeotropic removal of water formed in the reaction. Removal of water together with sufficient residence time will result in acetalization of over 80 weight percent.

The reaction process is preferably carried out in the presence of an inert gas such as nitrogen or argon, but can be carried out in the presence of air.

The process of instant invention is more concretely described with reference to the examples below, wherein all parts and percentages are by weight unless otherwise specified. The examples are provided to illustrate the instant invention and not to limit it.

EXAMPLE 1

In a batch process, a 500 ml reactor equipped with a stirring device and a collection/liquid phase separation apparatus was charged with 20.0 g of powdered (approximately 2,000 molecular weight) poly (vinyl acetal) and 250 ml of butyraldehyde. The reactor was carefully purged with an inert gas, argon. The mixture was rapidly stirred and heated to the reflux temperature of butyraldehyde, at which point all of the powdered poly (vinyl alcohol) was in solution The water-butyraldehyde azeotrope (68° C.) was distilled until the theoretical amount of water was collected. The reaction mixture was cooled, and the excess butyraldehyde was removed by vacuum stripping. The resulting viscous polymer, poly (vinyl acetal), weighed 33.0 g, showing a 65% increase in weight and corresponding to a greater than 90% butyralization.

EXAMPLE 2

In a continuous process, an argon-purged, 10% by weight slurry of powdered (approximately 2,000 molecular weight) poly (vinyl alcohol) in butyraldehyde is fed by pumping to a stirring reactor heated to from about 60° C. to about 98° C. so that acetalization begins, and an azeotrope is maintained. The desired acetalization equilibrium composition is attained by removing the aldehyde-water azeotrope in the reactor overhead stream. Effluent from the stirred reactor is transferred to a settling chamber where any remaining water by-product is removed from the bottom portion and the aldehyde-polymer solution is removed overhead. Any unreacted poly (vinyl alcohol) and aldehyde can be recycled. The aldehyde-polymer effluent is then carried to a heated aldehyde stripping zone and the concentrated polymer product is processed for final aldehyde removal and drying.

While certain embodiments and details have been shown for the purpose of illustrating this invention, it will be apparent to those skilled in the art that various changes and modifications may be made herein without departing from the spirit and scope of the invention.

I claim:

1. A catalyst free method for the production of poly (vinyl acetals) comprising
contacting poly (vinyl alcohol) with a stoichiometric excess of at least one aldehyde containing from 1 to 6 carbon atoms in a liquid state at a temperature from about 60° C. to about 150° C. and pressure from about 1 to 15 atmospheres to carry out a condensation reaction to produce poly (vinyl acetal) and water, wherein the reaction proceeds by removing aldehydes and water as an aldehyde-water azeotrope until the reaction is completed.

2. A process as described in claim 1 wherein the aldehydes are linear-aliphatic aldehydes containing from 1 to 3 carbon atoms.

3. A process as described in claim 2 when carried out at a temperature from 60° C. to 100° C.

4. A process as described in claim 3 when carried out using at least a 5 to 1 aldehyde poly (vinyl alcohol) excess.

* * * * *